United States Patent Office 3,840,658
Patented Oct. 8, 1974

3,840,658
ANIMAL FEED SUPPLY
Jinnosuke Abe, Kango Miyauchi, and Masatoshi Kanoh, Ohhito-machi, Japan, assignors to Toyo Joze Kabushiki Kaisha, Takata-gun, Shizuoka-ken, Japan
No Drawing. Continuation-in-part of application Ser. No. 94,183, Dec. 1, 1970, now Patent No. 3,749,580, which is a continuation-in-part of abandoned application Ser. No. 714,019, Mar. 18, 1968. This application Mar. 27, 1973, Ser. No. 345,414
Claims priority, application Japan, Mar. 16, 1967, 42/19,517
The portion of the term of the patent subsequent to July 31, 1990, has been disclaimed
Int. Cl. A23k 1/00
U.S. Cl. 424—115                          4 Claims

ABSTRACT OF THE DISCLOSURE

An animal feed supply, which contains a small amount of the cultured products obtained from a strain of mold fungus belonging to the genus Fusarium and the species moniliforme.

CROSS-REFERENCE TO RELATED APPLICATION

This application is a continuation-in-part application of of our earlier co-pending application Ser. No. 94,183 filed Dec. 1, 1970, now Pat. No. 3,749,580, which in turn is a continuation-in-part application of our earlier co-pending application Ser. No. 714,019 filed Mar. 18, 1968, by the same inventors, the latter application being abandoned, which claims priority from Mar. 16, 1967 based on Japanese patent application Ser. No. 19,517/67.

BACKGROUND OF THE INVENTION

Field of the Invention

This invention relates to an improvement in feed supplies for domestic animals, birds and the like.

Description of the Prior Art

Domestic and cultured animals and birds naturally constitute an important protein source for human beings.
There are a large number of research treatises on strengthened feed supplies which have added thereto only vitamins, minerals and/or antibiotic substances. Other proposals have been directed to strengthening a low grade feed supply by adding a digesting enzyme or the like thereto. According to another proposal, a low grade feed supply is subjected to specific treatments to enrich the feed.

The main object of the present invention is to provide an improved feed supply which is capable of considerably accelerating the growing rate of domestic animals such as oxen, cows, horses, pigs, rabbits, sheep, goats and the like, in comparison to regular feed fed to animals.

There is one prior suggestion to use culture products of mold fungi belonging to the genus Fusarium as an animal feed, according to which Gibberellin is used as the additive (U.S. Pat. No. 2,943,938, De Zeeuw et al.). According to a further proposal, estrogenic compounds are admixed with the feed (U.S. Pat. No. 3,196,019, Andrews et al.). It has been further proposed to use the mucelial cake of Gibberella fujikuroi for similar purposes (U.S. Patent No. 2,913,340, Chornock et al.).

It should be noted that the strains of the genus Fusarium used in the manufacture of animal feed according to the present invention do not produce any Gibberellin and/or estrogenic compounds, which is a considerable difference from conventional feeds utilized in the prior art. A further difference between the present invention and the prior art is that the animal feed in the former does not contain mycelial cake.

SUMMARY OF THE INVENTION

The present invention provides an animal feed comprising a normal feed containing, as a supplement, the culture products of a strain of mold fungus belonging to the genus Fusarium and species moniliforme.

The mold fungus, Fusarium moniliforme, of the present application is a strain designated by applicants as M-005, which is on deposit at the Northern Marketing and Nutrition Research Division of the United States Department of Agriculture, located in Peoria, Illinois. The NRRL number assigned to applicants' strain of Fusarium moniliforme, is that of "NRRL-5679."

The quantity of the culture products added to the feed depends naturally upon the kind and nature of animals to be fed, and also upon the specific and occasional culture stage of the living stock. Generally speaking, however, the amount of culture products added to the feed will range from 0.05 to 5 weight percent, preferably from 0.1 to 1.0 weight percent, based upon the dry weight of the raw feed, in order to obtain the desired results.

DESCRIPTION OF THE PREFERRED EMBODIMENTS

In the manufacture of the strengthened feed supply of the present invention, the mold fungus Fusarium moniliforme is cultured in a liquid culture medium.

In the industrial manufacture of the strengthened feed supply according to this invention, the following process may preferably be adopted.

The mold fungus is cultured in a liquid culture medium, the fungus mycelia are removed thereform, the filtrate is, after adding the proper supplementary additives such as malt dextrin and the like, spray-dried to provide a powder product which is ready for use.

The culture product as obtained in the aforementioned manner by use of the mold fungus Fusarium moniliforme is then added to the feed material, so as to produce the strengthened feed supply proposed by the present invention. Generally speaking, the powder-like product referred to above, obtained by spray-drying the culture medium filtrate, after being admixed with a proper quantity of malt dextrin, may be added as is, to the raw feed material, when the latter is a solid mixture, in a proper ratio as will become more clear hereinafter. If the feed is in a liquid state, such as, for instance, artificial milk, the powder-like product is either dissolved or suspended in the liquid material.

The structure of the effective substance contained in the aforementioned culture products contained in the filtrate from the cultured liquid medium and removed of the fungus bodies has not yet been determined. It is, however, believed that the substance is a kind of non-dialytic protein-like high molecular weight substance containing effective amounts of carbon, hydrogen and nitrogen sources, as well as other growth factors for the fungi. The isoelectric point of the substance is in the acidic pH range. The substance can be precipitated from the nutrient liquid medium by the addition of a water-miscible organic solvent such as alcohol, acetone or the like. This effective substance is soluble in water, but insoluble in various organic solvents. When the strengthened feed according to this invention is fed to the domestic animals, the growth rate thereof will increase from 20 to 50% in comparison with the case where a non-strengthened regular feed is fed to the animals.

As an example, the female pig will generally deliver eight piglets after a pregnancy of about 115 days. The natural nursing period after delivery is about 60 days. Since it is possible to give birth twice per year, however, a 60-day nursing period imposes a considerably heavy load upon the female which may cause physical asthemia and invite adverse effects on the next succeeding pregnancy. Therefore, the piglets must be fed with artificially regenerated milk, generally after a lapse of time of 30–40 days after delivery. The feed is then changed from regenerated milk to a certain weaning feed for piglets at about 60–70 days which is thence gradually converted into the normal adult feed supply. Frequent scours will be encountered in these feed-change periods and the growth of the piglets may substantially stop or may be otherwise adversely affected.

If, according to the novel teachings of this invention, the culture product is added to the regenerated milk or the weaning feed in an amount of from 0.5 to 1%, it is surprisingly observed that the rate of growth of the piglets increases 20–50% in comparison with other cases. No scours are generally encountered. Similar results are obtained when rabbits, mice, rats, oxen, cows, cocks, hens and the like animals are fed with the strengthened feed of the present invention.

The following several preferred examples will be described for a better understanding of the present invention.

EXAMPLE 1

(1) Preparation of Culture Products of Mold Fungi, Fusarium Moniliforme

Mold fungi, *Fusarium moniliforme,* were inoculated in a 100 ml. of Waksman culture medium, sterilized and placed in a 500 ml. conical flask and shake-cultured at 30° C., for 24 hours. The cultured medium was then transferred into a 15 liter jar fermenter, containing a sterilized liquid culture medium (pH being 7.0, measured in advance of sterilization), said medium comprising: 5% glucose, 2% corn steep liquor, 0.2% calcium carbonate and 0.05% potassium dihydrogen phosphate and aeratingly fermented at 30° C., for 30 hours. The broth was transferred into a 500 liter fermentation tank, sterilized at 120° C., for 20 minutes, containing 250 liters of a liquid fermentation medium comprising: 2% glucose, 3% wheat bran, 0.2% ammoniu msulfate, and 0.2% calcium carbonate, and aeratingly fermented at 30° C. for 40 hours. The thus-fermented broth was transferred into a 30 m.$^3$ fermentation tank, sterilized at 120° C., for 20 minutes and containing 15 m.$^2$ of a liquid nutritious medium comprising: 3% rice bran, 3% wheat bran, 0.2% ammonium sulfate and 0.2% calcium carbonate, and aeratingly fermented at 30 C., for 110 hours. After the final fermentation, fungus mycelia were filtered off and the filtrate was concentrated in vacuo from 14.5 m.$^3$ to 1 m.$^3$.

200 kg. of malt dextrin were added to the concentrated product, agitated thoroughly and finally spray-dried to provide 380 kg. of cultured products.

(2) First Example of Breeding Piglets

To regenerated milk, prescribed in J.A.S.-Standards "B," 0.5% of the above fermentation product from *Fusarium moniliforme* was added, and the strengthened feed milk was fed to six 35-day-old piglets of Yorkshire origin, three male and three female, for 30 days. These piglets were fed for an additional 33 days with a commercially available mixed feed for this purpose, containing 34% wheat bran, 22% corn, 7.3% soya bean cake, 7% fish meal, 1.5% calcium carbonate, 0.5% secondary calcium phosphate, 0.5% sodium chloride, 0.1% minerals, 0.05% vitamins and 0.05% antibiotics with 15.3% DCP (direct crude protein) and 68.2% TDN (total direct nitrogen), having added thereto 0.5% of the fermentation product as obtained above, the overall feeding period thus amounting to 9 weeks.

In comparison with the above, 3 male and 3 female piglets were simultaneously fed with a similar feed, yet having none of the fermentation product of the present invention.

The results are shown in the following Tables 1 and 2.

TABLE 1.—CONSUMED FEED QUANTITY AND FEED DEMAND RATIO

| | Number of piglets tested | Initial weight before test (kg.) | Last weight after test (kg.) | Weight increase of— | | Growth ratio (percent) | Growth index | Consumed feed quantity (kg.) | Feed demand ratio |
|---|---|---|---|---|---|---|---|---|---|
| | | | | Kg. | Per day (Percent) | | | | |
| Normally-fed piglets | 6 | 6.58 | 19.90 | 13.32 | 211 | 202.4 | 100 | 35.433 | 2.66 |
| Piglets fed with strengthened feed | 6 | 6.24 | 30.70 | 24.46 | 388 | 391.9 | 193 | 50.041 | 2.05 |

NOTE.—Growth ratio = $\dfrac{\text{Weight increase}}{\text{Initial weight before test}} \times 100.$   Feed demand ratio = $\dfrac{\text{Consumed feed quantity}}{\text{Weight increase}}$

TABLE 2

| Period | Initiation of feeding | After— | | | | | | | | |
|---|---|---|---|---|---|---|---|---|---|---|
| | | 7 days | 14 days | 21 days | 28 days | 35 days | 42 days | 49 days | 56 days | 63 days |
| Normally fed piglets: | | | | | | | | | | |
| Weight (kg.) | 6.58 ±0.64 | 6.40 ±0.34 | 6.75 ±0.64 | 8.18 ±0.69 | 9.37 ±0.63 | 11.50 ±0.78 | 13.53 ±3.25 | 15.53 ±3.88 | 17.38 ±5.24 | 19.90 ±90 |
| Growth ratio (percent) | | 5.31 | 19.14 | 15.63 | 18.38 | 15.01 | 14.25 | 11.24 | 13.51 | |
| Piglets fed with strengthened feed: | | | | | | | | | | |
| Weight (kg.) | 6.24 ±0.67 | 6.66 ±0.76 | 8.24 ±1.03 | 10.34 ±1.17 | 12.52 ±1.22 | 15.40 ±1.21 | 18.90 ±3.72 | 22.31 ±4.22 | 26.08 ±4.36 | 30.70 ±5.43 |
| Growth ratio (percent) | | 6.51 | 21.20 | 22.60 | 19.07 | 20.63 | 20.46 | 16.54 | 15.58 | 16.27 |

NOTE: Growth ratio = $\dfrac{W_2 - W_1}{\frac{1}{2}(W_1 + W_2)} + 100.$ $W_2$ applies to the piglet at the time of weight testing. $W_1$ specifies the piglet's weight at the next prior weight testing.

(3) Second breeding examples of piglets

To the aforementioned regenerated milk was added 0.5% and 1%, respectively, of the culture product obtained from *Fusarium moniliforme* used in the foregoing Example 1–(1), and this intensified feed was fed to 6 piglets, 3 being male and 3 being female, of Berkshire origin for 35 days after 50 days from their delivery. The results are shown in the following Tables 3 and 4.

TABLE 3

Weight-increase (average weight shown by kg.)

| | Initiation of feeding | After— | | | | |
|---|---|---|---|---|---|---|
| | | 7th day | 14th day | 21st day | 28th day | 35th day |
| Fed with feed containing 1% cultured products | 6.55 | 6.90 | 8.90 | 11.20 | 12.5 | 13.0 |
| Fed with feed containing 0.5% cultured products | 7.60 | 8.70 | 9.60 | 12.0 | 15.8 | 16.3 |
| Normally fed | 7.10 | 7.30 | 8.15 | 9.60 | 10.3 | 11.7 |

TABLE 4.—CONSUMED FEED QUANTITY AND FEED DEMANDED RATIO

|  | Number of piglets under test | Initial weight before test (kg.) | Last weight after test (kg.) | Weight increase (kg.) | Growth ratio/ day (g.) | Growth index (percent) | Consumed feed quantity (kg.) | Feed demand ratio |
|---|---|---|---|---|---|---|---|---|
| Feed containing 1% cultured products | 2 | 6.55 | 12.0 | 6.45 | 184 | 98.4 | 10.35 | 1.60 |
| Feed containing 0.5% cultured products | 2 | 7.60 | 16.3 | 8.7 | 249 | 114.4 | 11.45 | 1.32 |
| Normal feed | 2 | 7.10 | 11.7 | 4.60 | 131 | 64.8 | 10.60 | 2.30 |

(4) Third example of feeding piglets

The culture product obtained in the foregoing Example 1–(1) from *Fusarium moniliforme* was added to a commercially available piglet-breeding feed in an amount of 0.1%, the feed having a composition of 30.0% wheat bran; 15.0% defatted rice bran; 23.0% corn starch; 15.0% barley; 7.0% soya bean cake, 7.0% fish meal; 1.5% calcium carbonate; 0.5% secondary calcium phosphate; 0.5% sodium chloride; 0.1% minerals; 0.05% vitamins and 0.05% antibiotics; 14.45% D.C.P. and 67.38% T.D.N. 4 piglets of Berkshire origin were fed with the strengthened feed. The results are shown in Table 5.

TABLE 5

| Group | Number of piglets under test | Initial weight before test (kg.) | Last weight after test (kg.) | Weight increase of— Kg. | Weight increase of— Per day (g.) | Growth ratio (percent) | Growth index | Consumed feed quantity (kg.) | Feed demand ratio |
|---|---|---|---|---|---|---|---|---|---|
| Normally fed | 4 | 14.85 | 37.78 | 22.93 | 382 | 154.4 | 100 | 90.6 | 3.95 |
| Fed with strengthened feed | 4 | 16.06 | 45.03 | 28.97 | 483 | 180.3 | 117 | 83.7 | 2.89 |

EXAMPLE 2

100 ml. of 1%-glucose buillon was charged in a 500 ml. conical flask, sterilized at 120° C. for 20 minutes, and inoculated with *Fusarium moniliforme*, and then shake-cultured at 30° C. for 24 hours. This cultured medium was transferred to a sterilized jar fermenter, containing 20 liters of a liquid nutritious medium comprising 3.5% glucose; 1.5% corn steep liquor; 0.3% ammonium sulfate; 0.2% calcium carbonate; 0.05% potassium dihydrogen phosphate and 0.05% magnesium sulfate, and fermented under aeration at 30° C. for 30 hours. The thus-cultured medium was further transferred to a 500 liter fermentation tank containing 200 liters of a liquid nutritious medium comprising 5% wheat bran; 0.2% ammonium sulfate and 0.1% calcium carbonate and fermented at 30° C. for 24 hours. The cultured broth was further mixed with 10 m.$^2$ of another liquid nutritious medium comprising 3% rice bran; 2% wheat bran; 0.2% ammonium sulfate and 0.1% calcium carbonate in a fermentation tank having a capacity of 15 m.$^3$ and then fermented at 30° C. for 96 hours under aeration. The fungus mycelia was filtered off and 8.6 m.$^3$ of the filtrate was then mixed with 140 kgs. of malt dextrin and spray-dried. 253 kgs. of a powder-like product were obtained.

0.5% of the fermentation product was then added to the same piglets' feed supply as used in Example 1–(2), and six piglets were fed with this strengthened feed for 85 days. In comparison, the same feed supply without the addition of said fermentation product thereto was fed to a second group of six piglets.

In these test feedings, two groups of the same number of piglets derived from a common father pig and two different mother pigs, were fed in order to obviate hereditary and unexpectable influences. The test results are shown in the following Table 6. As seen in the Table, the piglets fed with the strengthened feed supply showed a 18–25% mean higher growth increase than the other piglets when measured after 60 days from the initiation of the feed test.

TABLE 6

|  | Initiation of feeding | After— 7 days | 14 days | 21 days | 28 days | 35 days | 42 days | 49 days | 56 days | 63 days |
|---|---|---|---|---|---|---|---|---|---|---|
| Normally fed: Weight (kg.) | 14.85 ±2.84 | 17.68 ±3.16 | 20.05 ±2.91 | 21.33 ±1.81 | 22.85 ±2.64 | 25.03 ±4.79 | 27.75 ±5.91 | 30.95 ±6.32 | 35.40 ±6.70 | 37.78 ±6.49 |
| Growth ratio (percent) |  | 17.37 | 12.59 | 6.16 | 6.91 | 9.08 | 10.32 | 10.90 | 13.41 | 6.49 |
| 0.5% strengthendly fed: Weight (kg.) | 16.06 ±2.28 | 20.50 ±5.65 | 22.47 ±4.79 | 26.13 ±6.78 | 28.43 ±7.21 | 42.26 ±8.18 | 36.23 ±8.94 | 39.20 ±8.60 | 43.07 ±8.83 | 45.03 ±9.43 |
| Growth ratio (percent) |  | 24.24 | 9.15 | 15.08 | 8.43 | 12.63 | 11.58 | 7.86 | 9.40 | 4.46 |

NOTE:

Growth ratio = $\frac{W_2 - W_1}{\frac{1}{2}(W_1 + W_2)} \times 100$.

$W_2$ indicates the piglet at the time of weight testing.
$W_1$ indicates the weight of the prior weight testing.

EXAMPLE 3

The cultured product obtained in the Example 1–(1) was added to a commercially available chick-breeding feed in an amount of 0.5%, the feed having a composition shown in the following Table 9, and 50 chicks, Wellbrine origin, were fed with the above-intensified feed for 30 days after 3 days from delivery. Reference chicks were also fed, but with the comparative non-intensified feed. All the chicks in the test were fed naturally with a properly selected amount of green vegetables.

The results are shown in Table 8. As is seen, the growth increase ratio amounted to about 30% relative to the reference.

TABLE 8

|  | No. of chicks | Mean initial weight (g.) | Mean final weight (g.) | Mean weight increase | Mean weight increase per day (g.) | Mean quantity of consumed feed (g.) |
|---|---|---|---|---|---|---|
| Reference | 50 | 33.7 | 274 | 240 | 7.1 | 454 |
| Test with strengthened feed | 50 | 33.0 | 355 | 322 | 10.7 | 430 |

TABLE 9
Composition of Feed

Corn, wheat, bean cake, heat-treated soy bean cake, gingelly oil cake, fish meal, dried blood powder, wheat bran, defatted rice bran, lusam meal, yeast, calcium, phosphate, calcium carbonate, manganese sulfate, zinc sulfate, sodium chloride, vitamins,[1] .G.FU.,[2] antibiotics, antinematodes and minerals.[3]

EXAMPLE 4

The cultured product obtained in Example 1 was added to a feed having the following composition in an amount of 1% and 20 mice were fed therewith. A higher growth increase rate of 15–25% was observed than in the case of the reference.

Composition of Feed (total: 100 g.):

| | | |
|---|---|---|
| Crude protein | g | 24.0 |
| Calcium | percent | 1.0 |
| Crude fat | g | 3.5 |
| Phosphor | percent | 1.0 |
| Magnesium | do | 0.27 |
| Crude cellulose | g | 4.5 |
| Crude ash | g | 6.0 |
| Sodium | percent | 0.31 |
| Soluble nitrogen | g | 56.0 |
| Potassium | percent | 0.85 |
| Calcium pantothenate | mg | 30 |
| Manganese | p.p.m | 60.00 |
| Niacin | mg | 80 |
| Iron | p.p.m | 100.00 |
| Folic acid | mg | 0.2 |
| Calcium/phosphor |  | 1.00 |
| Vitamin A | I.U | 10 |
| Calcium/magnesium |  | 3.00 |
| Vitamin D3 | I.U | 2 |
| Potassium/manganese |  | 2.74 |
| Vitamin E | mg | 15 |
| Vitamin B1 | mg | 7 |
| Vitamin B2 | mg | 10.0 |
| Vitamin B6 | mg | 4.0 |
| Vitamin B12 | mg | 0.02 |

EXAMPLE 5

Rats were used instead of the mice in Example 4 and the test procedures were substantially the same as in Example 2. Similar results were obtained as those in Example 4.

EXAMPLE 6

The cultured product obtained in Example 1 was added to a rabbit-feeding feed supply in an amount of 2.5% having the following composition for feeding rabbits.

Composition of Feed (total: 100 g.):

| | | |
|---|---|---|
| Crude protein | g | 20.5 |
| Calcium | percent | 1.2 |
| Crude fat | g | 3.0 |
| Phosphor | percent | 0.58 |
| Crude cellulose | g | 11.5 |
| Magnesium | percent | 0.22 |
| Crude ash | g | 8.0 |
| Sodium | percent | 0.32 |
| Soluble nitrogen | g | 51.0 |
| Potassium | percent | 1.02 |
| Calcium pantothenate | mg | 20 |
| Manganese | p.p.m | 56.25 |
| Niacin | mg | 70 |
| Iron | p.p.m | 155.00 |
| Folic acid | mg | 0.2 |
| Calcium/phosphor |  | 2.06 |

---

[1] Vitamins A, D, thiamine, riboflavin, biotin; pantothenic acid, niacin, folic acid, vitamins B, –E, –K, pyridoxine.
[2] Unknown growth factors.
[3] Included trace minerals such as Fe, Cu, Co, K, and the like.

Composition of Feed (total: 100 g.):

| | | |
|---|---|---|
| Vitamin A | I.U | 50 |
| Calcium/magnesium |  | 5.45 |
| Vitamin D3 | I.U | 3600 |
| Potassium/manganese |  | 3.18 |
| Vitamin E | mg | 15 |
| Vitamin B1 | mg | 5 |
| Vitamin B2 | mg | 10 |
| Vitamin B6 | mg | 4.0 |
| Vitamin B12 | mg | 0.02 |
| Vitamin C | mg | 2.00 |

The results were such that a growth rate of the rabbits fed with the strengthened feed was 50% higher than the comparative conventional feeding.

EXAMPLE 7

10 rabbits were fed with normal green weeds and vegetables, of which, however, 5 rabbits were fed for two months with the green feed containing the cultured product obtained in Example 2 and dissolved in a physiological saline solution, said product being dosed at the rate of 100 mg./kg./day, or more specifically 5 ml./animal/day. It was found that a 15–20% higher growth ratio was attained than in the reference rabbits.

EXAMPLE 8

1000 ml. of 1%-glucose buillon was equally divided and charged into 10 separate conical flasks, each having a 500 ml. capacity, and upon regular sterilization, inoculated with strains of *Fusarium moniliforme,* and then shake-cultured at 30° C. for 24 hours. The inoculating liquor thus prepared was introduced into a fermentation tank, of 200 liter capacity, containing, after being sterilized at 120° C. for 20 minutes, 100 liters of a nutritious liquid medium, and then fermented at 30° C. for 96 hours under aeration. The thus cultured broth was filtered and alcohol in an amount of 5 times the amount present was added under agitation. The resulting precipitate dried to 500 g. of a powder-like product as before.

This powder was added to a conventional commercial feed supply for piglets of Berkshire origin in an amount of 0.5% for 60 days after 60 days from the delivery, the feed supply being of the same composition disclosed in Example 2. The test results were such that the piglets fed with the strengthened feed showed a 23%-higher growth ratio in the mean than the reference piglets fed with the comparative regular feed.

EXAMPLE 9

Two calves of Holstein origin were fed with a regular feed, strengthened with 0.5% of the cultured product obtained in Example 1 for 15 months. The thus fed calves had 375 kg. of mean growth weight, while the comparative reference animals showed only 330 kg. of mean weight gain.

The present invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

In all the foregoing experiments, reference to the *mold fungus Fusarium moniliforme,* is that strain of the microorganism identified earlier as applicants' designation M–005, or "NRRL–5679."

What is claimed is:
1. An animal feed composition, comprising, in admixture:
   (1) a conventional animal feed, and
   (2) an effective quantity of a dried product free of fungus mycelia, obtained from the aerobic cultiva- tion, in a liquid nutrient medium, sufficient to sustain normal growth of a Gibberellin non-producing strain of mold fungus *Fusarium moniliforme* NRRL 5679.

2. The animal feed composition of Claim 1, wherein the dried product, free of fungus mycelia, is added to the feed in an amount of from 0.05% to 5.0% by weight, based on the dry weight of the feed.

3. The animal feed composition of Claim 1, wherein the dried product, free of fungus mycelia, is added in the form of a white powder, spray-dried and obtained from the liquid broth of the fermentation of said mold fungus.

4. The animal feed composition of Claim 1, wherein the dried product, free of fungus mycelia, is added to the feed in an amount of from 0.1 to 1.0% by weight, based on the dry weight of the feed.

References Cited

UNITED STATES PATENTS 3,749,580 7/1973 Abe et al. ............. 99—9

LIONEL M. SHAPIRO, Primary Examiner

U.S. Cl. X.R.

426—204